(12) United States Patent
Cilli et al.

(10) Patent No.: US 11,125,346 B2
(45) Date of Patent: Sep. 21, 2021

(54) PREVENTION OF GAS MIGRATION THROUGH DOWNHOLE CONTROL LINES

(71) Applicant: WEATHERFORD TECHNOLOGY HOLDINGS, LLC, Houston, TX (US)

(72) Inventors: Otavio Maffud Cilli, Houston, TX (US); Don A. Hopmann, Alvin, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 0 days.

(21) Appl. No.: 16/398,480

(22) Filed: Apr. 30, 2019

(65) Prior Publication Data

US 2020/0347945 A1 Nov. 5, 2020

(51) Int. Cl.
*E21B 34/10* (2006.01)
*F16K 15/00* (2006.01)

(52) U.S. Cl.
CPC .............. *F16K 15/00* (2013.01); *E21B 34/10* (2013.01)

(58) Field of Classification Search
CPC ..................................................... E21B 34/10
See application file for complete search history.

(56) References Cited

U.S. PATENT DOCUMENTS

| | | | |
|---|---|---|---|
| 2005/0274528 A1 | 12/2005 | Hiron et al. | |
| 2011/0132618 A1* | 6/2011 | Panian | E21B 34/10 166/373 |
| 2012/0145399 A1 | 6/2012 | Schultz et al. | |
| 2015/0369005 A1* | 12/2015 | Vick, Jr. | F16K 1/32 166/319 |
| 2017/0211347 A1* | 7/2017 | Vasques | E21B 33/1243 |

FOREIGN PATENT DOCUMENTS

WO 2011100176 A1 8/2011

OTHER PUBLICATIONS

Weatherford Advanced Well Systems; "Binary Control Valve", company article, dated 2017, 4 pages.
Weatherford Advanced Well Systems; "Hydraulic ROSS—Variable (HRV™) Valve", company article, dated 2017, 11 pages.
International Search Report with Written Opinion dated Jun. 2, 2020 for PCT Patent Application No. PCT/US2020/024589, 12 pages.

\* cited by examiner

*Primary Examiner* — Paul J Gray
(74) *Attorney, Agent, or Firm* — Smith IP Services, P.C.

(57) ABSTRACT

A gas migration prevention module can include a housing, control line connections configured to connect the housing between control line sections, spaced apart pistons sealingly received in the housing, and a fluid volume defined between the pistons. A control line system can include an upper control line section, a lower control line section in fluid communication with a downhole tool, and a gas migration prevention module connected between the upper and lower control line sections, the lower control line section providing fluid communication between the gas migration prevention module and the downhole tool, and the gas migration prevention module comprising spaced apart pistons and a fluid volume defined between the pistons, the fluid volume being in fluid communication with an exterior of the gas migration prevention module.

19 Claims, 3 Drawing Sheets

PREVENTION OF GAS MIGRATION THROUGH DOWNHOLE CONTROL LINES

BACKGROUND

This disclosure relates generally to equipment utilized and operations performed in conjunction with a subterranean well and, in an example described below, more particularly provides for prevention of gas migration through control lines in wells.

Gas migration through downhole fluid systems can cause significant problems for well operations. For example, the presence of gas in downhole control lines can lead to hydrate formation in the control lines, which can block or obstruct the control lines. The gas could also accumulate in a wellhead outlet, which can be a safety concern.

Therefore, it will be readily appreciated that improvements are continually needed in the art of preventing gas migration in downhole fluid systems. Such improvements can be useful in a wide variety of different types of downhole fluid systems.

DETAILED DESCRIPTION

Figure 1:
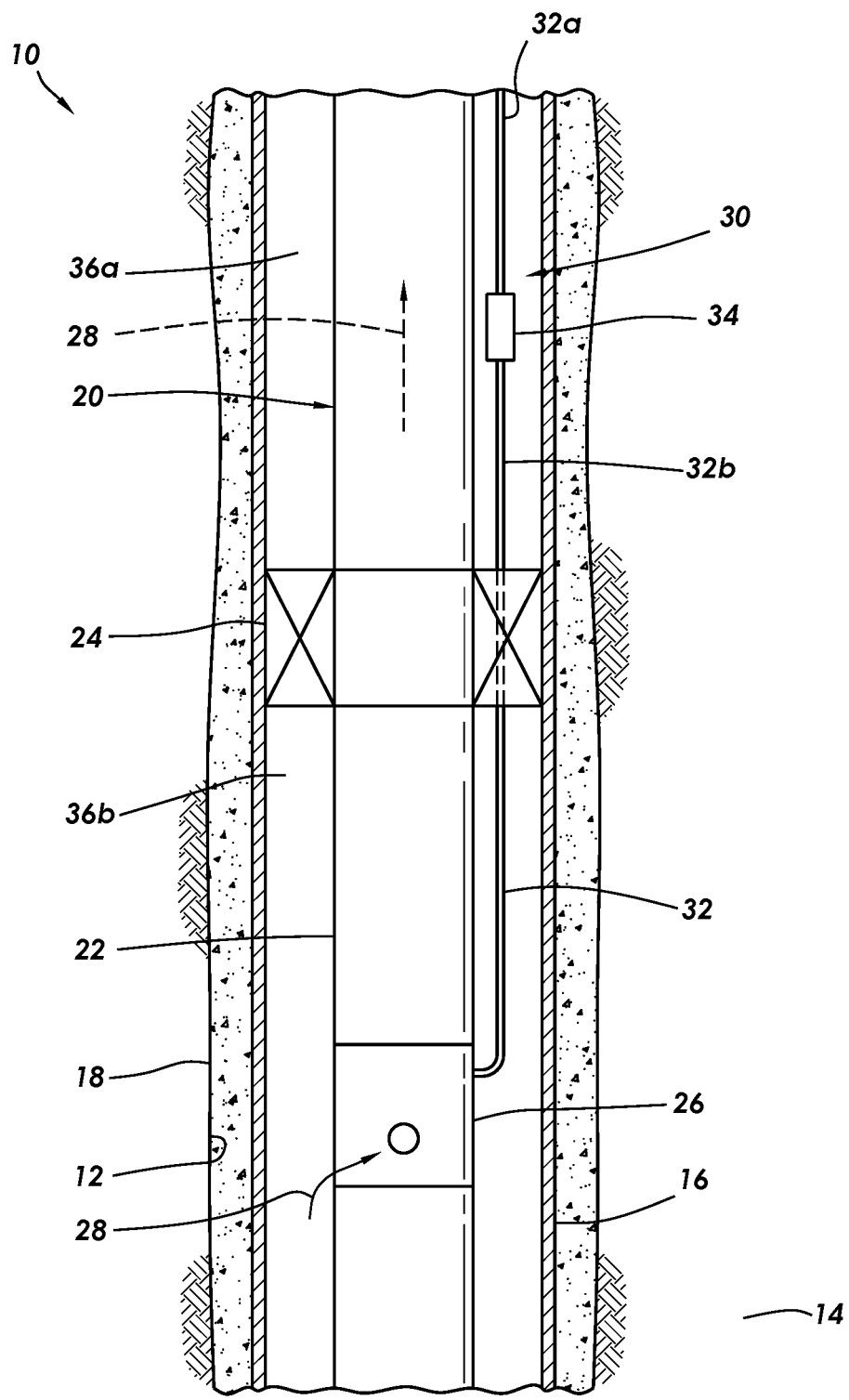
FIG. 1 is a representative partially cross-sectional view of an example of a well system and associated method which can embody principles of this disclosure.

Representatively illustrated in FIG. 1 is a system 10 for use with a subterranean well, and an associated method, which system and method can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, a wellbore 12 has been drilled into an earth formation 14. The wellbore 12 is lined with casing 16 and cement 18. In other examples, the principles of this disclosure could be practiced in an open hole or uncased section of the wellbore 12.

As depicted in FIG. 1, a generally tubular completion string 20 has been installed in the wellbore 12. The completion string 20 in this example includes tubing 22, a packer 24 and a downhole tool 26. In other examples, the completion string 20 could include different, more or less components. Thus, the scope of this disclosure is not limited to any particular number, combination or configuration of components used in a completion string.

The completion string 20 depicted in FIG. 1 is of the type known to those skilled in the art as a production string, since its purpose is to produce fluids 28 (such as, liquid and/or gaseous hydrocarbons) from the formation 14. In other examples, other types of tubular strings may be used (such as, an injection string). Thus, the scope of this disclosure is not limited to use of any particular type of tubular string in a well.

The downhole tool 26 depicted in FIG. 1 is of the type known to those skilled in the art as a production control valve, since its purpose is to control flow of the fluids 28 from the formation 14 into the completion string 20. In other examples, the downhole tool 26 could be another type of tool (such as, a safety valve, an artificial lift tool, a chemical injection tool, etc.) and could serve another purpose. Thus, the scope of this disclosure is not limited to use of any particular type of downhole tool.

In the FIG. 1 example, a control line system 30 is used to control operation of the downhole tool 26. The control line system 30 includes a tubular control line 32 connected to the downhole tool 26 (such as, to an actuator of the downhole tool).

The control line 32 in this example extends to the earth's surface (such as, to a pump or other pressure source at a land or water based rig or production facility). The control line 32 serves as a conduit for fluid and pressure communication between the surface and the downhole tool 26, so that the downhole tool can be selectively and remotely operated (for example, to variably regulate flow of the fluids 28).

In other examples, the control line 32 could extend to a subsea pressure source or another type of fluid source. The control line 32 could be positioned internal or external to any tubular string (such as, the completion string 20 or the casing 16). Thus, the scope of this disclosure is not limited to the configuration, position or extent of the control line 32 as depicted in FIG. 1.

Although fluid in the control line 32 is effectively isolated from the well fluids 28, it is still possible for migration of gas to occur from the fluids 28 to the fluid in the control line 32 below the packer 24. Therefore, it would be beneficial to be able to prevent any gas that may have entered the control line 32 below the packer 24 from being able to migrate further through the control line (for example, to prevent or at least mitigate formation of hydrates in the control line or accumulation of gas at a surface control system).

The control line system 30 depicted in FIG. 1 includes a gas migration prevention module 34 connected between upper and lower sections 32a,b of the control line 32. In this example, the module 34 prevents migration of any gas in the lower control line section 32b to the upper control line section 32a. Instead, the module 34 enables any gas in the lower control line section 32b to be discharged into an annulus 36a formed between the completion string 20 and the casing 16 (or the wellbore 12 if uncased or open hole) above the packer 24.

The packer 24 isolates the annulus 36a above the packer from a lower annulus 36b below the packer by forming a seal radially between the completion string 20 and the casing 16 (or the wellbore 12 if uncased or open hole). The lower annulus 36b has the well fluids 28 therein (as does an interior of the completion string 20). In this example, the well fluids 28 in the lower annulus 36b and/or in the interior of the completion string 20 may be the source of the gas that migrates into the lower control line section 32b. However, the scope of this disclosure is not limited to any particular source of gas migration into a control line.

In the FIG. 1 example, the lower control line section 32b extends through the packer 24 between the module 34 and the downhole tool 26. In other examples, separate control line sections may be used above and below the packer 24, and it is not necessary for the control line itself to extend through the packer (for example, a fluid passage may be provided in the packer, instead of a tubular control line). Thus, the scope of this disclosure is not limited to the particular control line arrangement or configuration depicted in FIG. 1.

Figure 2:
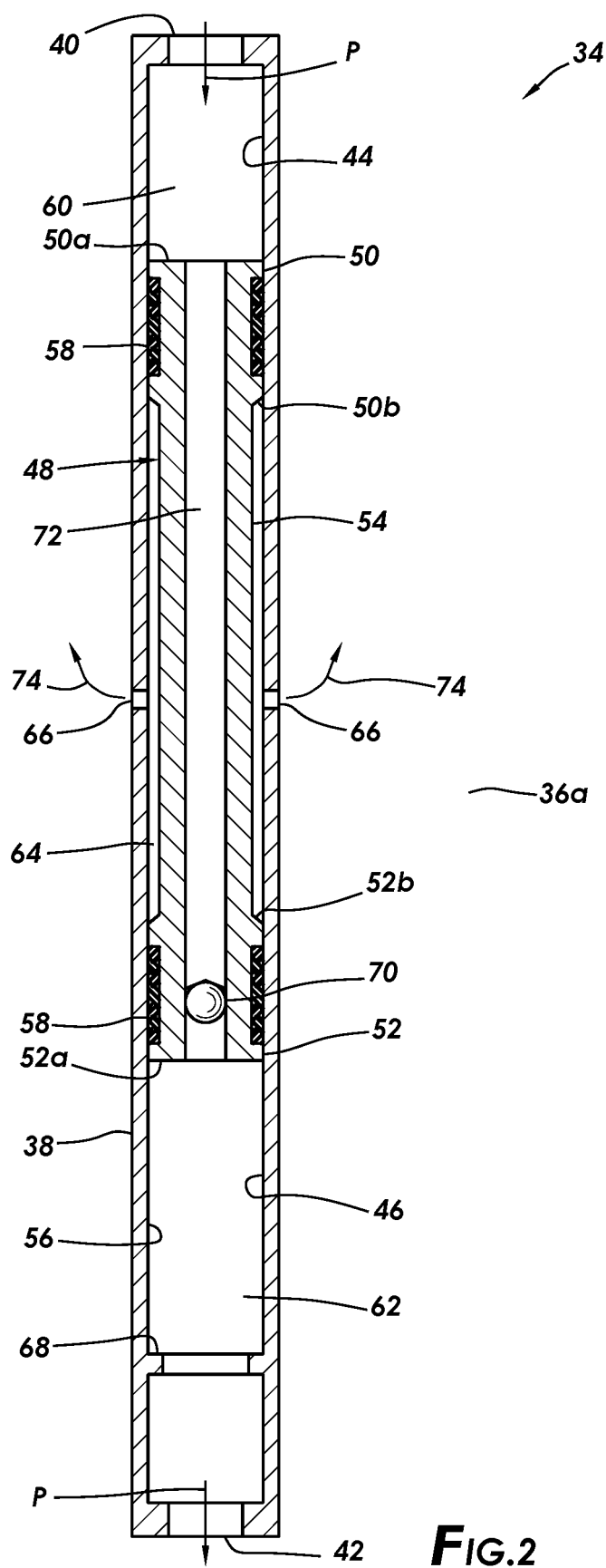
FIG. 2 is a representative cross-sectional view of a control line gas migration prevention module that may be used in the system and method of FIG. 1, and which can embody the principles of this disclosure.

Referring additionally now to FIG. 2, an example of the gas migration prevention module 34 is representatively illustrated apart from the remainder of the well system 10 and control line system 30 of FIG. 1. The module 34 may be used in systems and methods other than those depicted in FIG. 1, in keeping with the principles of this disclosure.

The module 34 is described below as it may be used in the well system 10 and control line system 30 of FIG. 1. However, if the module 34 is used with other systems or methods, the operation or configuration of the module and its environment can differ from those described below, and so it should be clearly understood that the scope of this disclosure is not limited to any particular operation, configuration or environment for use of the module as described herein.

In the FIG. 2 example, the module 34 includes a generally tubular housing 38 having upper and lower control line connections 40, 42 at its opposite ends. When used in the system 30 of FIG. 1, the upper control line connection 40 fluidly connects the upper control line section 32a to an upper fluid chamber 44 in the housing 38, and the lower control line connection 42 fluidly connects the lower control line section 32b to a lower fluid chamber 46 in the housing 38. The control line connections 40, 42 may in some examples be externally testable metal-to-metal connections, but other types of connections may be used in keeping with the principles of this disclosure. An in-line control line filter may also be provided in some examples to prevent debris from entering the chamber 44.

The fluid chambers 44, 46 are separated by a piston assembly 48. The piston assembly 48 in this example comprises longitudinally spaced apart upper and lower pistons 50, 52. The pistons 50, 52 are rigidly connected to each other by a generally tubular intermediate section 54, so that the pistons displace together and maintain their spaced apart relationship in the housing 38.

In other examples, the pistons 50, 52 could be structurally connected in a different manner (for example, using a rod or another structural member or combination of components). Thus, the scope of this disclosure is not limited to use of any particular configuration or arrangement of the pistons 50, 52 or their structural connection.

The pistons 50, 52 are reciprocably and sealingly received in a bore 56 formed in the housing 38. Seals 58 (which may be non-elastomeric in some examples) carried on the pistons 50, 52 sealingly engage the bore 56. In other examples, the seals 58 could engage separate spaced apart bores formed in the housing 38. Thus, the scope of this disclosure is not limited to any particular configuration of the bore 56 or the sealing engagement between the pistons 50, 52 and the bore.

The pistons 50, 52 and the intermediate section 54 are depicted in FIG. 2 as being portions of a single member. In other examples, the pistons 50, 52 and the intermediate section 54 could be separate members. Thus, the scope of this disclosure is not limited to any particular configuration of the piston assembly 48.

The piston assembly 48 is a "floating" piston assembly, in that net forces due to pressure differentials across the pistons 50, 52 are typically "balanced." Thus, if a pressure P is applied via the upper control line section 32a and the upper connection 40 to the fluid chamber 44, the same pressure P will be transmitted to the lower fluid chamber 46 and via the lower connection 42 to the lower control line section 32b and the downhole tool 26.

More specifically, an upper piston area 50a of the upper piston 50 is exposed to the upper fluid chamber 44 and is in contact with a fluid 60 in the upper fluid chamber and in the upper control line section 32a. A lower piston area 50b of the upper piston 50 is exposed to an annular fluid volume 64 formed longitudinally between the pistons 50, 52 and radially between the intermediate section 54 and the housing 38. A lower piston area 52a of the lower piston 52 is exposed to the lower fluid chamber 46 and is in contact with a fluid 62 in the lower fluid chamber and in the lower control line section 32b. An upper piston area 52b of the lower piston 52 is exposed to the annular fluid volume 64. The piston areas 50a, 52a are the same, and the piston areas 50b, 52b are the same (in this example), and so the net forces on the piston assembly 48 due to pressure differentials across the pistons 50, 52 are balanced, or the piston assembly will displace in the housing 38 as needed to achieve this balance, so that the pressures P in the fluid chambers 44, 46 are typically the same.

In the FIG. 2 example, the fluid volume 64 is in communication with an exterior of the housing 38 via ports 66 formed through a side wall of the housing between the pistons 50, 52. In the FIG. 1 system 10, the exterior of the housing 38 corresponds to the upper annulus 36a above the packer 24. In other examples, the ports 66 could provide for fluid communication between the fluid volume 64 and another area (such, as the interior of the completion string 20 or another tubular string, etc.) exterior to the housing 38. One or more filters could be provided to prevent debris from entering the fluid volume 64 via the ports 66.

Thus, the scope of this disclosure is not limited to any particular form or arrangement of the fluid communication between the fluid volume 64 and another area in the well.

An annular shoulder 68 formed in the housing 38 limits downward displacement of the piston assembly 48. The shoulder 68 ensures that a certain volume of the fluid 62 remains in the fluid chamber 46 when the piston assembly 48 is downwardly displaced, for a purpose described more fully below. However, the shoulder 68 is not necessary, in keeping with the principles of this disclosure.

The fluids 60, 62 in the upper and lower control line sections 32a,b and in the upper and lower fluid chambers 44, 46 may be the same in some examples. However, certain advantages may be obtained by use of different fluids 60, 62. For example, it could be beneficial to use a relatively highly hydrate inhibiting or corrosion resistant fluid 60 (e.g., an alcohol-containing fluid) in the upper control line section 32a. As another example, it could be beneficial to use a relatively high lubricity fluid 62 in the lower control line section 32b.

As yet another example, it may be economically advantageous to use a relatively inexpensive water-based fluid 60 in the upper control line section 32a, and an oil-based fluid 62 in the lower control line section 32b. A lubricity enhancer that may be added to the fluid 62 is HW-443 or HW-445, available from MacDermid Plc of the United Kingdom. A suitable water-based fluid is TRANSAQUA HT available from Castrol Limited. A suitable oil-based fluid is TELLUS 32 available from Shell.

In the FIG. 2 example, a flow passage 72 extends longitudinally through the piston assembly 48. A relief valve or check valve 70 permits flow from the upper control line section 32a and upper fluid chamber 44 to the lower fluid chamber 46 and lower control line section 32b in certain situations described more fully below. Multiple relief or check valves 70 could be provided in some examples for redundancy.

Preferably, a predetermined pressure differential across the check valve 70 is required in order to open the check valve and permit flow from the upper fluid chamber 44 to the lower fluid chamber 46 via the passage 72. The check valve 70 prevents flow from the lower control line section 32*b* and the lower fluid chamber 46 to the upper fluid chamber 44 and upper control line section 32*a*.

In operation, the floating piston assembly 48 transmits pressure P between the control line sections 32*a,b* and upper and lower fluid chambers 44, 46 by appropriately displacing in the housing 38. Pressure may be transmitted in either direction via the module 34.

If gas migrates into the fluid 62 in the lower control line section 32*b*, the gas can further migrate into the fluid chamber 46 below the piston assembly 48. The gas can then migrate past the seal 58 on the piston 52 and into the fluid volume 64 between the pistons 50, 52. Once the gas 74 is in the fluid volume 64, the ports 66 will allow the gas to flow to the exterior of the housing 38 (e.g., into the annulus 36*a*).

Thus, the gas 74 will not migrate into the fluid 60 in the upper fluid chamber 44 and the upper control line section 32*a*. Instead, the gas 74 will flow into the annulus 36*a* and then eventually to the surface for collection and disposal or storage. In this manner, the presence of the gas 74 in the upper control line section 32*a* is avoided.

Figure 3:
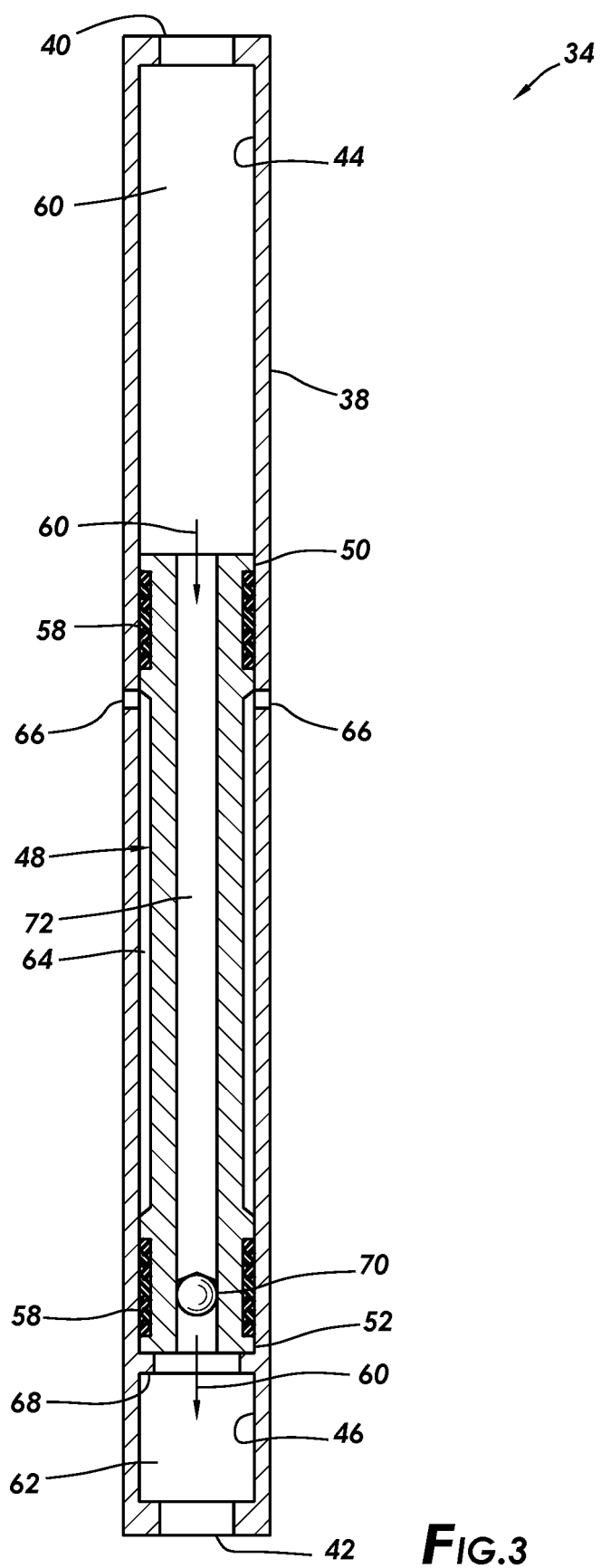
FIG. 3 is a representative cross-sectional view of the control line gas migration prevention module in a fluid make-up configuration.

Referring additionally now to FIG. 3, another configuration of the gas migration prevention module 34 is representatively illustrated. In this configuration, the fluid 60 is flowed from the upper control line section 32*a* and the upper fluid chamber 44 to the lower fluid chamber 46 and lower control line section 32*b* via the flow passage 72 and check valve 70.

This configuration can be advantageous in the event that leakage has depleted the fluid 62 in the lower control line section 32*b* (for example, due to imperfect seals in an actuator of the downhole tool 26, or leakage at control line connections, etc.). In that event, it is desirable to be able to replenish the fluid 62 by adding thereto a volume of the fluid 60.

In order to add a volume of the fluid 60 to the fluid 62, pressure in the upper control line 32*a* is increased to thereby cause the piston assembly 48 to displace downward, until it engages the shoulder 68 in the housing 38. When a pressure differential across the piston assembly 48 is then increased to a level above the predetermined pressure differential required to open the check valve 70, flow of the fluid 60 downward through the flow passage 72 and check valve 70 will be permitted.

Note that the pressure differential across the piston assembly 48 could be increased sufficiently to open the check valve 70, even if the shoulder 68 is not provided in the housing 38. However, use of the shoulder 68 ensures that a volume of the fluid 62 (which may have an enhanced lubricity as compared to the fluid 60) remains in the lower fluid chamber 46. This can help to ensure continued proper operation of the downhole tool 26 or an actuator thereof.

It may now be fully appreciated that the above disclosure provides significant advancements to the art of preventing gas migration in downhole fluid systems. In the control line system 30 of FIG. 1, the gas migration prevention module 34 prevents migration of gas 74 into an upper control line section 32*a*, while still providing for pressure transmission between the upper and lower control line sections 32*a,b* and to the downhole tool 26.

The above disclosure provides to the art a control line system 30 for use in a subterranean well. In one example, the system 30 can include a first control line section 32*a*, a second control line section 32*b* in fluid communication with a downhole tool 26, and a gas migration prevention module 34 connected between the first and second control line sections 32*a,b*. The second control line section 32*b* provides fluid communication between the gas migration prevention module 34 and the downhole tool 26. The gas migration prevention module 34 comprises first and second spaced apart pistons 50, 52 and a fluid volume 64 defined between the first and second pistons 50, 52. The fluid volume 64 is in fluid communication with an exterior of the gas migration prevention module 34.

In any of the control line system 30 examples described herein:

a packer 24 may be positioned between the downhole tool 26 and the gas migration prevention module 34;

the second control line section 32*b* may extend between the gas migration prevention module 34 and a packer 24;

a first fluid 60 in the first control line section 32*a* may contact the first piston 50, and a second fluid 62 in the second control line section 32*b* may contact the second piston 52, each of the first and second fluids 60, 62 being isolated from the fluid volume 64 between the first and second pistons 60, 62;

the first fluid 60 may be different from the second fluid 62;

the first fluid 60 may be a water-based fluid, and the second fluid 62 may be an oil-based fluid;

the first fluid 60 may have greater hydrate inhibition compared to the second fluid 62, and the second fluid 62 may have greater lubricity compared to the first fluid 60;

the first and second pistons 50, 52 may be constrained to displace together in at least one bore 56 of the gas migration prevention module 34;

the bore 56 may be formed in a housing 38, and at least one port 66 may be formed in a wall of the housing 38, the port 66 permitting flow between the fluid volume 64 and the exterior of the gas migration prevention module 34; and the gas migration prevention module 34 may include a flow passage 72 extending longitudinally through the first and second pistons 50, 52, and a check valve 70 that permits flow from the first control line section 32*a* to the second control line section 32*b* through the flow passage 72 but prevents flow from the second control line section 32*b* to the first control line section 32*a* through the flow passage 72.

The above disclosure also provides to the art a gas migration prevention module 34 for use in a subterranean well. In one example, the gas migration prevention module 34 can include a housing 38 having at least one bore 56 formed therein, and first and second control line connections 40, 42 configured to connect the housing 38 between respective first and second control line sections 32*a,b*, first and second spaced apart pistons 50, 52 sealingly received in the at least one bore 56, and a fluid volume 64 defined between the first and second pistons 50, 52. The first control line connection 40 provides fluid communication with a first fluid chamber 44 exposed to the first piston 50, and the second control line connection 42 provides fluid communication with a second fluid chamber 46 exposed to the second piston 52.

In any of the gas migration prevention module 34 examples described herein:

the fluid volume 64 may be in fluid communication with an exterior of the housing 38;

the fluid volume 64 may be isolated from each of the first and second fluid chambers 44, 46 (such as, by the seals 58);

a first fluid 60 in the first fluid chamber 44 may contact the first piston 50, and a second fluid 62 in the second fluid chamber 46 may contact the second piston 52;

the first fluid 60 may be different from the second fluid 62;

the first fluid 60 may be a water-based fluid, and the second fluid 62 may be an oil-based fluid;

the first fluid 60 may have greater hydrate inhibition compared to the second fluid 62, and the second fluid 62 may have greater lubricity compared to the first fluid 60;

the first and second pistons 50, 52 may be constrained to displace together in the at least one bore 56;

at least one port 66 in a wall of the housing 38 may permit flow between the fluid volume 64 and an exterior of the gas migration prevention module 34; and the gas migration prevention module 34 may include a flow passage 72 extending longitudinally through the first and second pistons 50, 52, and a check valve 70 that permits flow from the first fluid chamber 44 to the second fluid chamber 46 through the flow passage 72 but prevents flow from the second fluid chamber 46 to the first fluid chamber 44 through the flow passage 72.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," "upward," "downward," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A control line system for use in a subterranean well, the system comprising:

a control line which supplies fluid pressure from a pressure source to a downhole tool, the control line including a first control line section in fluid communication with the pressure source, and the control line including a second control line section in fluid communication with a fluid pressure inlet of the downhole tool; and a gas migration prevention module connected between the first and second control line sections, the second control line section providing fluid communication between the gas migration prevention module and the fluid pressure inlet, the gas migration prevention module comprising first and second spaced apart pistons and a fluid volume defined between the first and second pistons, the fluid volume being in fluid communication with an exterior of the gas migration prevention module, and the gas migration prevention module further comprising a flow passage extending longitudinally through the first and second pistons, in which at least one check valve is positioned in the flow passage, and in which the at least one check valve permits flow from the first control line section to the second control line section through the flow passage but prevents flow from the second control line section to the first control line section through the flow passage.

2. The system of claim 1, in which a packer is positioned between the downhole tool and the gas migration prevention module.

3. The system of claim 1, in which the second control line section extends between the gas migration prevention module and a packer.

4. The system of claim 1, in which a first fluid in the first control line section contacts the first piston, and a second fluid in the second control line section contacts the second piston, each of the first and second fluids being isolated from the fluid volume between the first and second pistons.

5. The system of claim 4, in which the first fluid is different from the second fluid.

6. The system of claim 4, in which the first fluid is a water-based fluid, and the second fluid is an oil-based fluid.

7. The system of claim 4, in which the first fluid has greater hydrate inhibition compared to the second fluid, and the second fluid has greater lubricity compared to the first fluid.

8. The system of claim 1, in which the first and second pistons are constrained to displace together in at least one bore of the gas migration prevention module.

9. The system of claim 8, in which the bore is formed in a housing, and further comprising at least one port in a wall of the housing, the port permitting flow between the fluid volume and the exterior of the gas migration prevention module.

10. A control line system for use in a subterranean well, the system comprising:

a first control line section;

a second control line section in fluid communication with a downhole tool; and a gas migration prevention module connected between the first and second control line sections, the second control line section providing fluid communication between the gas migration prevention module and the downhole tool, and the gas migration prevention module comprising first and second spaced apart pistons and a fluid volume defined between the first and second pistons, the fluid volume being in fluid communication with an exterior of the gas migration prevention module, in which the gas migration prevention module further comprises a flow passage extending longitudinally through the first and second pistons, and at least one check valve that permits flow from the first control line section to the second control line section through the flow passage but prevents flow from the second control line section to the first control line section through the flow passage.

11. A gas migration prevention module for use in a subterranean well, the gas migration prevention module comprising:
- a housing having at least one bore formed therein, and first and second control line connections configured to connect the housing between respective first and second control line sections;
- first and second spaced apart pistons sealingly received in the at least one bore, the first control line connection providing fluid communication with a first fluid chamber exposed to the first piston, and the second control line connection providing fluid communication with a second fluid chamber exposed to the second piston;
- a fluid volume defined between the first and second pistons, in which the fluid volume is isolated from each of the first and second fluid chambers;
- a flow passage extending longitudinally through the first and second pistons; and
- at least one check valve positioned in the flow passage, in which the at least one check valve permits flow from the first control line section to the second control line section through the flow passage but prevents flow from the second control line section to the first control line section through the flow passage.

12. The gas migration prevention module of claim 11, in which the fluid volume is in fluid communication with an exterior of the housing.

13. The gas migration prevention module of claim 11, in which a first fluid in the first fluid chamber contacts the first piston, and a second fluid in the second fluid chamber contacts the second piston.

14. The gas migration prevention module of claim 13, in which the first fluid is different from the second fluid.

15. The gas migration prevention module of claim 13, in which the first fluid is a water-based fluid, and the second fluid is an oil-based fluid.

16. The gas migration prevention module of claim 13, in which the first fluid has greater hydrate inhibition compared to the second fluid, and the second fluid has greater lubricity compared to the first fluid.

17. The gas migration prevention module of claim 11, in which the first and second pistons are constrained to displace together in the at least one bore.

18. The gas migration prevention module of claim 11, further comprising at least one port in a wall of the housing, the port permitting flow between the fluid volume and an exterior of the gas migration prevention module.

19. A gas migration prevention module for use in a subterranean well, the gas migration prevention module comprising:
- a housing having at least one bore formed therein, and first and second control line connections configured to connect the housing between respective first and second control line sections;
- first and second spaced apart pistons sealingly received in the at least one bore, the first control line connection providing fluid communication with a first fluid chamber exposed to the first piston, and the second control line connection providing fluid communication with a second fluid chamber exposed to the second piston; and
- a fluid volume defined between the first and second pistons, in which the gas migration prevention module further comprises a flow passage extending longitudinally through the first and second pistons, and at least one check valve that permits flow from the first fluid chamber to the second fluid chamber through the flow passage but prevents flow from the second fluid chamber to the first fluid chamber through the flow passage.

* * * * *